[3.]  M. OSBORN.  2 Sheets--Sheet 2.
Apparatus for Raising Sunken Vessels.
No. 118,741.   Patented Sep. 5. 1871.
Fig. 3.   Fig. 4.   Fig. 5.
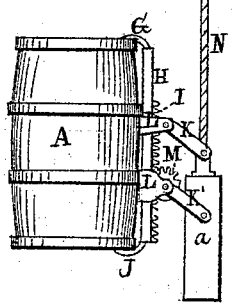
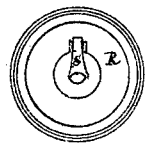
Fig. 6.
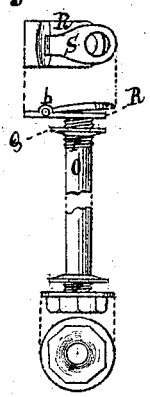
Fig. 9.   Fig. 10.   Fig. 11.
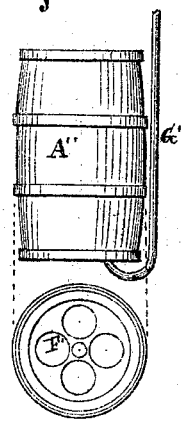
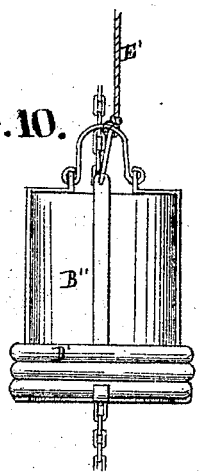
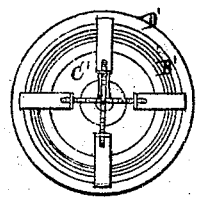
Fig. 12.
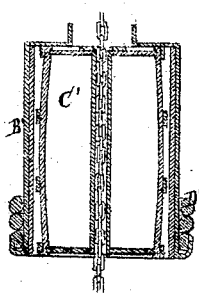
Inventor.
M. Osborn.
per Burridge & Co.
Attys Cleveland. O.
Witnesses.
J. H. Burridge.
D. L. Humphrey No. 118,741

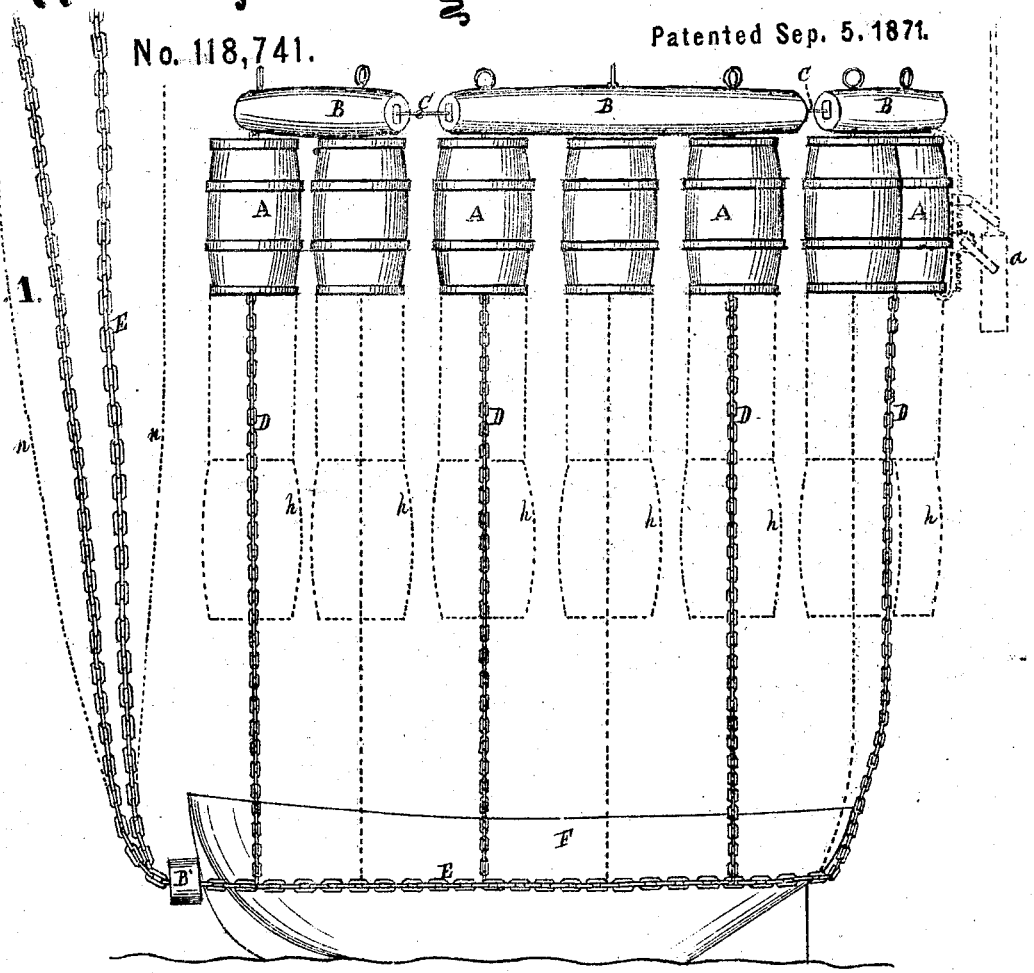
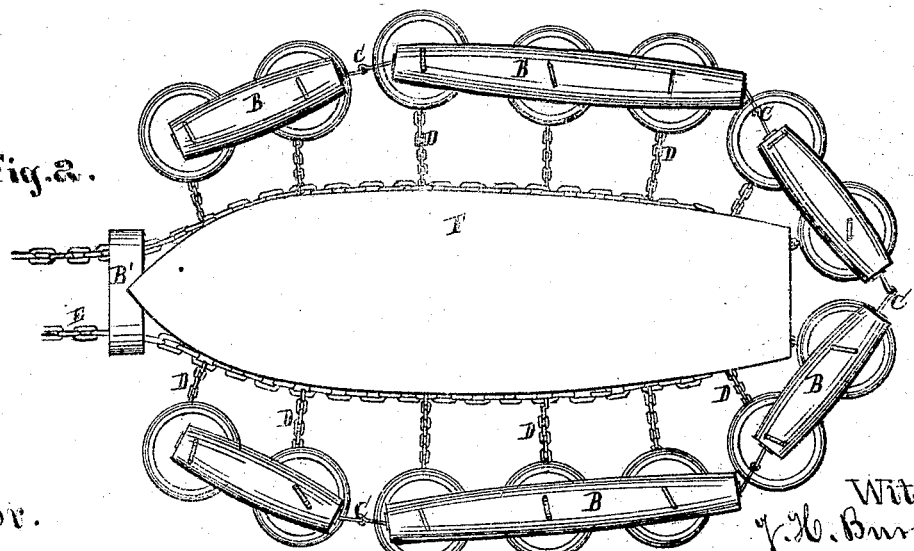

UNITED STATES PATENT OFFICE.

MILO OSBORN, OF CLEVELAND, OHIO.

IMPROVEMENT IN APPARATUS FOR RAISING SUNKEN VESSELS.

Specification forming part of Letters Patent No. 118,741, dated September 5, 1871.

*To all whom it may concern:*

Be it known that I, MILO OSBORN, of Cleveland, in the county of Cuyahoga and State of Ohio, have invented a certain new and Improved Apparatus for Raising Sunken Vessels; and I do hereby declare that the following is a full, clear, and complete description thereof, reference being had to the accompanying drawing making part of the same.

Figure 1, Plate 1, is a side view of the apparatus as arranged for use. Fig. 2 is a plan view. The several figures on Plate 2 are detached sections, to which reference will be made.

Like letters of reference refer to like parts in the several views.

My present invention consists of certain improvements in devices for raising sunken vessels, being, in part, improvements upon devices set forth in Letters Patent of the United States granted to me June 15, 1858, and numbered 20,578. I use in the main the system of chains and buoys set forth and shown in the patent referred to.

The main cable E is connected to the buoys by vertical cables attached to it at suitable intervals. I now use, however, floats B of suitable size and length of section, and suitably connected, like a boom, to which the vertical cables are attached, and which serve to support the cables and keep them arranged at proper distances asunder. With these floats the whole apparatus may be arranged in harbor or on shore, the cables being coiled on the line of buoys and bound by ropes, the floats holding the whole like a raft, making the whole easy of removal to the location of the sunken vessel and of handling when there. I have further improved the clamp by which the sinking weight is attached to the side of the buoy, and also the buoy-clutch; now using a central table, through the buoy, to which the same is attached, and through which the vertical cables are made to operate; and have provided an improved hollow adjustable sinker, fitting over the buoy. The clamp provided for the side of the buoy in my former patent was found in practice difficult to attach under water. My improved clamp consists of a flat hook, G, Fig. 3, having flanges H turned up at each side of its shank, forming a groove, G', Fig. 4, in which is fitted a sliding rack, I, having on its lower end a hook, J'. The weight *a* referred to is attached to the stem of the hook G by means of two pairs of links, K K', one end of which is pivoted to the weight, whereas the opposite end is pivoted to the stem of the hook G in the stays L, by which means the weight can be lifted or lowered in its position to the hooks, and which, on being moved, actuates the pinion M journaled in the cheeks of the links K', and made to engage the rack I of the hook J referred to. It will be obvious on examination of Fig. 3 that on lifting the weight *a*, by means of the rope N, the pinion will work the rack downward, thereby releasing the hook J from the lower end of the buoy; but when the weight is allowed to hang freely, as shown, the pinion and rack will draw the hook or hooks together, and thus fasten the weight securely to the buoys, as shown in said Fig. 3. As above said, the chains D pass through the buoys in order to be attached to the timbers or poles B. The chains pass through a tube secured therein, as shown in Figs. 1, 2. A detached view of said tube is shown in Fig. 6, in which O is the tube, and which is secured in the buoy as follows: On each end of the tube is cut a thread, P, to which is fitted a washer or collar, Q. To the thread also is fitted a plate, R, to which is pivoted, at the point *b*, a pawl, S, so arranged in its relation to the bore of the tube that the hole therein, when the pawl lies flat upon the plate, will partially shut over the bore, as shown in Fig. 6. The tube thus provided with washers is inserted in the buoy so that one washer shall be on the inside of each head. On the outside of the lower head or end a similar washer is screwed on the end of the tube, thereby clamping the lower end of the buoy between the two washers. Instead of a washer on the outside of the upper end or head is screwed the plate R, having thereto pivoted the pawl or dog S above described. By this means the tube is secured firmly through the middle of the buoy, as shown in Figs. 1, 2, and which also serves as an internal brace to support the two ends of the buoys against the external pressure of the water exerted upon them when submerged, in the manner as and for the purpose presently shown. It will be observed that the washer on the outside of the lower end of the buoy is made of considerable thickness, and that it has a wide flaring mouth or center opening. The purpose of the flaring rounded edge of the opening is to allow the chain to run freely into and through the tube, as it will run more easily over the rounded corner than over an angular one, like that in the plate on the outside of the upper head. Fig. 5 shows a slight modification of the clamping device, and which consists of the plate and pawl R S. The side sinker is attached by the clamp irrespective of the central cable; but in consequence of the sinker being attached to the buoys on one side thereof the tendency will be to carry the buoys down in a slanting direction, which ordinarily is of no material objection; but in the event it becomes necessary to sink the buoys in a vertical direction, so as to reach a certain point below, another form of sinker is used, and which is represented in Fig. 10. Said sinker consists of a cylinder, $B''$, of sufficient capacity to receive the buoy, as shown in Fig. 12, in which $C'$ is the buoy. On the outside of said cylinder are placed rings $D'$, more or less in number, as the weight of the sinker may be required to sink the buoy to a given depth, the rings resting on flanges on the bottom of the cylinder. This sinker is placed on over the buoy, and is detached therefrom when it is sunk to the required depth by pulling it up by the rope $E'$. The buoy will remain behind attached to the chain by means of the pawl above described. Fig. 11 represents a plan view of the cylindrical sinker. Fig. 9 represents another form of a buoy. Said buoy consists of a barrel, $A''$, similar to those above described; but instead of having two tight heads it has but one, and that the upper one. The lower one is perforated with holes $F'$, and which is chiefly intended to hold the lower end of the tube through which the chain is run. This buoy is sunk as are the others, and, when at the required depth, it is charged with air by means of a long tube, $G'$, the lower end of which is curved so that it will reach under the end of the buoy, as shown in the drawing, Fig. 9. This tube, which is of sufficient length to reach the surface of the water, and from which it is adjusted to the buoy, can be charged with air by means of a pump, thereby driving out the water that may have been in it. This mode of using the buoy is, in some instances, very desirable; but under ordinary circumstances the first above described is the best. The cable E, above described, is represented as extending upward to the surface of the water, whereas in practice it reaches but little above the hull of the the vessel; from thence upward it is a rope, as indicated by the dotted lines $n$, which is much lighter than a chain-cable, as indicated.

Having thus described my improvements, what I claim, and desire to secure by Letters Patent of the United States, is—

1. The central tube O, secured to the head of the buoy A by collars Q and plate R, the plate R being provided with the stop S, all substantially as set forth.

2. The clamp $A'$ arresting the hooks G, having side flanges H which form the groove $G'$, rack I, hook J, links K K, and pinion M, as arranged in relation to the buoy A and weight $a$, as set forth.

3. The sinker, Fig. 10, consisting of cylinder B made to fit over the buoy A, and the weights D fitting over the cylinder and resting on a flange or equivalent on its lower end, all as shown and described.

MILO OSBORN.

Witnesses:
J. H. BURRIDGE,
W. H. BURRIDGE.